United States Patent
Reddy et al.

(10) Patent No.: US 12,131,613 B2
(45) Date of Patent: Oct. 29, 2024

(54) SURVEILLANCE SYSTEM FOR DATA CENTERS AND OTHER SECURE AREAS

(71) Applicant: Honeywell International Inc., Charlotte, NC (US)

(72) Inventors: Chandrakantha Reddy, Bangalore (IN); Deepthi Sethuraman, Bengaluru (IN); Lalitha M. Eswara, Bengaluru (IN); Srikanth Nagaraj, Bangalore (IN); Umesh Hosamani, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 310 days.

(21) Appl. No.: 17/542,102

(22) Filed: Dec. 3, 2021

(65) Prior Publication Data

US 2023/0177934 A1 Jun. 8, 2023

(51) Int. Cl.
| | |
|---|---|
| G08B 13/196 | (2006.01) |
| G06N 20/00 | (2019.01) |
| G06V 10/70 | (2022.01) |
| G06V 20/52 | (2022.01) |
| G06V 40/16 | (2022.01) |
| G06V 40/20 | (2022.01) |

(52) U.S. Cl.
CPC ....... *G08B 13/19613* (2013.01); *G06N 20/00* (2019.01); *G06V 10/70* (2022.01); *G06V 20/52* (2022.01); *G06V 40/172* (2022.01); *G06V 40/20* (2022.01); *G08B 13/19608* (2013.01)

(58) Field of Classification Search
None
See application file for complete search history.

(56) References Cited

U.S. PATENT DOCUMENTS

| | | | | |
|---|---|---|---|---|
| 8,793,790 | B2 * | 7/2014 | Khurana | G06N 5/045 |
| | | | | 726/1 |
| 10,096,235 | B2 * | 10/2018 | Cobb | G08B 29/185 |
| 10,140,453 | B1 * | 11/2018 | Fridakis | G06F 21/577 |
| 10,505,959 | B1 * | 12/2019 | Wang | G06N 20/00 |

(Continued)

FOREIGN PATENT DOCUMENTS

| | | |
|---|---|---|
| CN | 113139476 A | 7/2021 |
| KR | 1784821 B1 | 10/2017 |

OTHER PUBLICATIONS

Arcules, "Cloud Security for Data Centers," 7 pages, 2021.

*Primary Examiner* — Ricky Chin
(74) *Attorney, Agent, or Firm* — Seager, Tufte & Wickhem, LLP

(57) ABSTRACT

During a deployment phase, each worker that enters a secure area is identified. The behavior of each worker is monitored while the worker is in the secure area in order to develop an Artificial Intelligence (AI) model that is specific to each worker and is representative of at least part of the behavior of the corresponding worker in the secure area. During an operational phase, each worker that enters the secure area is identified. The behavior of each worker is monitored while the worker is in the secure area. The current behavior of each worker in the secure area is compared with the behavior represented by the AI model that corresponds to the worker. An alarm is raised when the current behavior of one or more workers diverges from the behavior represented by the AI model that corresponds to the worker.

13 Claims, 8 Drawing Sheets

(56) References Cited

U.S. PATENT DOCUMENTS

| | | | | |
|---|---|---|---|---|
| 11,631,306 | B2* | 4/2023 | Srinivasan | H04N 21/4131 |
| | | | | 340/540 |
| 11,720,836 | B1* | 8/2023 | Coles | G06N 5/04 |
| | | | | 705/7.14 |
| 2003/0217024 | A1* | 11/2003 | Kocher | G08B 29/24 |
| | | | | 340/5.2 |
| 2010/0207762 | A1* | 8/2010 | Lee | G06V 20/52 |
| | | | | 340/541 |
| 2010/0208063 | A1* | 8/2010 | Lee | H04N 7/181 |
| | | | | 382/103 |
| 2011/0050876 | A1* | 3/2011 | Nagata | G08B 13/19613 |
| | | | | 382/218 |
| 2013/0030875 | A1* | 1/2013 | Lee | G06Q 30/0601 |
| | | | | 705/14.58 |
| 2013/0100268 | A1* | 4/2013 | Mihailidis | G08B 21/02 |
| | | | | 348/77 |
| 2014/0140590 | A1* | 5/2014 | Wilson | G06V 40/10 |
| | | | | 382/128 |
| 2014/0347479 | A1* | 11/2014 | Givon | G06V 40/103 |
| | | | | 382/116 |
| 2017/0126710 | A1* | 5/2017 | De-Levie | H04L 63/1425 |
| 2018/0024091 | A1* | 1/2018 | Wang | H04B 1/713 |
| | | | | 204/431 |
| 2018/0047274 | A1* | 2/2018 | Miwa | G07C 9/00571 |
| 2018/0330302 | A1* | 11/2018 | Peterson | G10L 25/66 |
| 2019/0164110 | A1* | 5/2019 | Shiraishi | G06N 20/20 |
| 2019/0180539 | A1* | 6/2019 | Alkhabbaz | G07C 9/0069 |
| 2019/0253314 | A1* | 8/2019 | Bou Fadel | G06V 10/82 |
| 2019/0392700 | A1* | 12/2019 | Darling | G08B 13/19684 |
| 2020/0074311 | A1* | 3/2020 | Li | G06N 3/006 |
| 2020/0383172 | A1* | 12/2020 | McCracken | H04W 88/06 |
| 2020/0412754 | A1* | 12/2020 | Crabtree | H04L 63/1425 |
| 2021/0004482 | A1* | 1/2021 | McFarlane | G16H 10/60 |
| 2021/0042509 | A1* | 2/2021 | Valiulla | G06N 20/00 |
| 2021/0288990 | A1* | 9/2021 | Kao | H04L 67/125 |
| 2022/0067208 | A1* | 3/2022 | Miller | G06Q 30/018 |
| 2022/0215347 | A1* | 7/2022 | Peres | G06N 3/045 |
| 2022/0368714 | A1* | 11/2022 | Garchery | H04L 63/1425 |
| 2022/0377093 | A1* | 11/2022 | Crabtree | H04L 43/045 |
| 2022/0391508 | A1* | 12/2022 | Garchery | G06F 21/55 |
| 2023/0039382 | A1* | 2/2023 | Xu | G06F 21/554 |
| 2023/0177934 | A1* | 6/2023 | Reddy | G06N 3/08 |
| | | | | 348/143 |

* cited by examiner

SURVEILLANCE SYSTEM FOR DATA CENTERS AND OTHER SECURE AREAS

TECHNICAL FIELD

The present disclosure pertains generally to systems and methods for providing surveillance within a secure area such as a data center.

BACKGROUND

A variety of secure areas such as data centers can be a hub for highly confidential information pertaining to individual users, companies and even countries. Data centers are frequently watched, such as through closed circuit television (CCTV) cameras, in order to detect the presence of outsiders. In some cases, however, individuals who are authorized to be in a data center can gain access to information they are not authorized to obtain. For example, a person who may be authorized to access particular servers in a data center may attempt to access information or alter settings of other servers that they are not authorized to access. It will be appreciated that it may be difficult to recognize such behavior by individuals who are authorized to be there. A need remains for systems and methods for detecting possible undesired behavior within a data center or other secure area.

SUMMARY

This disclosure relates generally to detecting possible undesired behavior within a secured area. An example is found in a method of monitoring worker behavior within a secured area that includes a deployment phase and an operational phase. During the deployment phase, each worker that enters the secure area is identified. The behavior of each worker is monitored while the worker is in the secure area. An Artificial Intelligence (AI) model is developed for each worker. The AI model is specific to each worker and is representative of at least part of the behavior of the corresponding worker in the secure area. During the operational phase, each worker that enters the secure area is identified. The behavior of each worker is monitored while the worker is in the secure area. The current behavior of each worker in the secure area is compared with the behavior represented by the AI model that corresponds to the worker. An alarm is raised when the current behavior of one or more workers diverges from the behavior represented by the AI model that corresponds to the worker.

Another example is found in a system for monitoring worker behavior within a secure area. The system includes a memory, a security camera in the secure area, and one or more processors that are operably coupled to the memory and the security camera. The one or more processors are configured to maintain an Artificial Intelligence (AI) model (or other suitable model) for each worker in the memory, wherein the AI model is specific to each worker and is representative of at least part of a behavior of the corresponding worker in the secure area. The one or more processors are configured to receive a video stream from the security camera and to process the video stream to identify each worker that enters the secure area and track a current behavior of each worker within the secure area. The one or more processors are configured to compare the current behavior of each worker in the secure area with the behavior represented by the AI model that corresponds to the worker, and to transmit an alarm when the current behavior of one or more workers diverges from the behavior represented by the AI model that corresponds to the worker.

Another example is found in a non-transitory, computer-readable storage medium having instructions stored thereon. When executed by one or more processors, the instructions cause the one or more processors to develop an AI (artificial intelligence) model for each of a plurality of workers by monitoring a behavior of each of the plurality of workers in a secure area. The one or more processors are caused to subsequently compare a current behavior for each of the plurality of workers in the secure area with the AI model that corresponds to each worker, and to raise an alarm when the current behavior of one or more of the plurality of workers diverges from the AI model for the corresponding worker.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
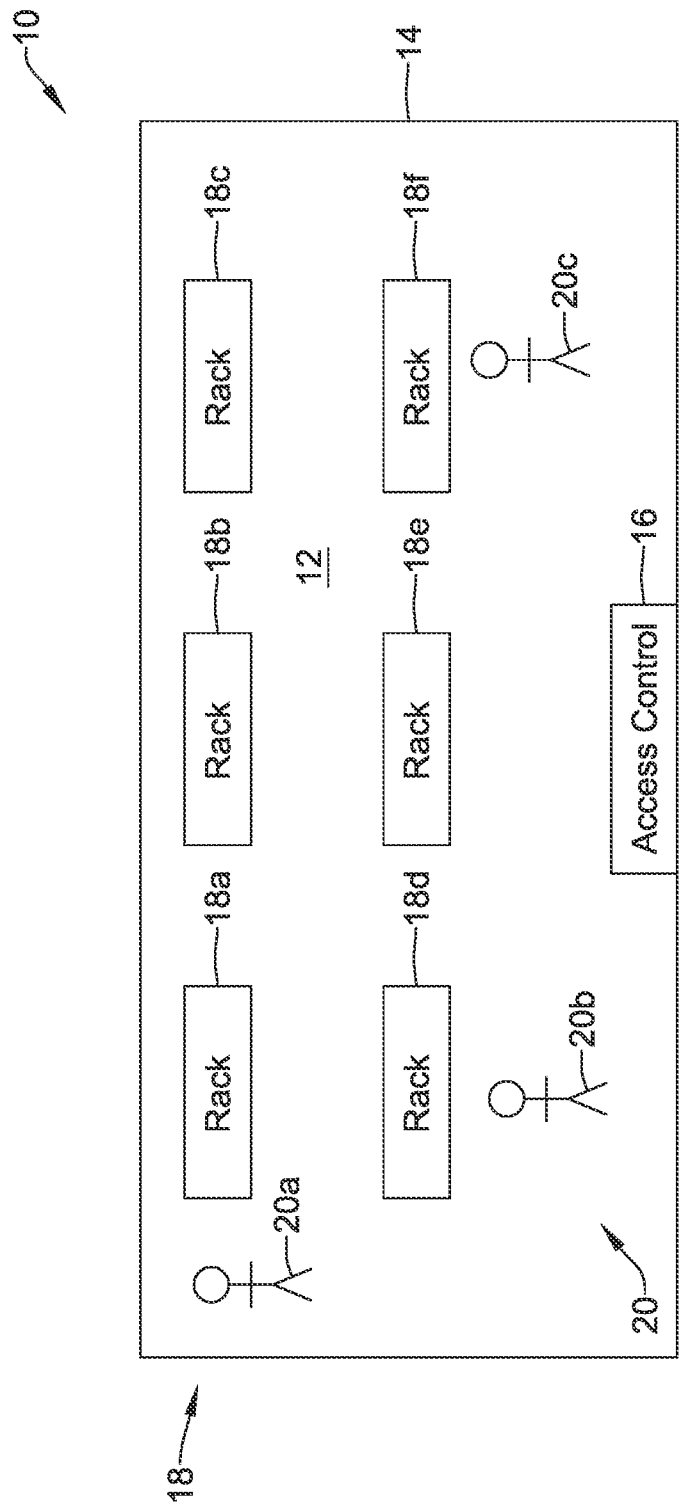
FIG. 1 is a schematic block diagram of an illustrative data center.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise.

The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative data center 10. The illustrative data center 10 may be considered as an example of a secure area in which there is a desire to monitor the behavior of the workers within the secure area. Another example of a secure area in which there is a desire to monitor the behavior of people within the secure area, including the workers, is a bank or other facility that handles large amounts of cash. Another example is a manufacturing clean room in which particular procedures are followed in order to reduce or even eliminate possible contamination of whatever is being manufactured within the manufacturing clean room. These are just example secure areas.

The data center 10 may be considered as occupying a secure area 12 that is defined by walls or other barriers 14. Entry into the secure area 12 is achieved by successfully passing through an access mechanism (e.g. door) that is protected by access control 16. The access control 16 may include a card reader that reads an access card presented by each person wishing to gain entrance to the secure area 12 and automatically compares the identification of each person to a list of who is authorized to gain access to the secure area 12. Those who are authorized are allowed entry, others are not. Access control 16 may unlock the access mechanism (e.g. the door) to allow passage of those persons that are determined to be authorized.

In some cases, the access control 16 may include a camera that captures a still picture or a brief video clip of a person desiring entrance, and includes a controller that is configured to perform video analytics such as facial recognition to ascertain the identity of the particular person. Once identified, the controller may compare the person's identity to a list of authorized people, and may permit entrance if the person is authorized.

In some cases, the access control 16 may include a security guard, for example, who checks the identification of each person wishing to gain entrance to the secure area 12, and manually compares each person's identity to a list showing who is to be granted access. These are just examples of possibilities for the access control 16.

In the example shown, the secure area 12 includes a number of server racks 18, individually labeled as 18a, 18b, 18c, 18d, 18e and 18f. While a total of six server racks 18 are shown, it will be appreciated that this is merely illustrative, as the secure area 12 may include any number of server racks 18 and in some cases may include a substantially greater number of server racks 18. Each of the server racks 18 includes a plurality of individual computer servers.

In some cases, there is a desire to not only limit access to the secure area 12 to authorized individuals, but also to track what those authorized individuals are doing within the secure area 12. For illustrative purposes, the secure area 12 is shown as including a total of three authorized workers 20, individually labeled as 20a, 20b and 20c. In some cases, there may be fewer than three authorized workers 20 within the secure area 12. There may be more than three authorized workers 20 within the secure area 12. Each of the authorized workers 20 are authorized to be within the secure area 12. As shown, the authorized worker 20a is near the server rack 18c, the authorized worker 20b is near the server rack 18d and the authorized worker 20c is near the server rack 18f.

In some cases, an authorized worker 20 may be authorized to be within the secure area 12, but may be engaged in activities that they are not authorized for. For example, say that the authorized worker 20a has a work order to perform maintenance on the server rack 18a, but as can be seen, is hanging out near the server rack 18c, and is perhaps working on a computer server in server rack 18c. This may be an honest mistake, such as they incorrectly identified the server rack 18c as being the server rack 18a, or the authorized worker 20a may have nefarious intent. For example, the server rack 18c may include computer servers containing data for a company that is in competition with another company having data that is contained within the server rack 18a.

One example of possible nefarious intent is an authorized worker 20 hanging around a particular server rack 18 that they are not authorized to be near, or to perform work on that particular server rack 18. Another example would be an authorized worker 20 who is trained or certified only to perform certain hardware repairs, but they are seen performing software updates, or vice versa. Accordingly, being able to track the behavior of individual authorized workers 20 would be beneficial to help improve the overall security of the secure area 12. It will be appreciated that monitored "behavior" can include temporal and/or spatial movements within the secure area 12. Monitored "behavior" can also include indications that a particular authorized worker 20 is misbehaving, including but not limited to excessive blinking, excessive sweating, excessive head turning (swiveling) and/or other indications of nervousness. More generally, monitored "behavior" can include any erratic or suspicious behavior. This may include a person attempting to hide their face, for example. Monitored "behavior" may also include keystroke tracking, an act of physically connecting a user device (e.g. laptop) to a particular server or server rack, an act of connecting ports of two or more servers or server racks, inserting a memory stick into a port of a particular server or server rack and/or another other "behavior" that may be normal or abnormal depending on the circumstances. These are just examples.

Figure 2:
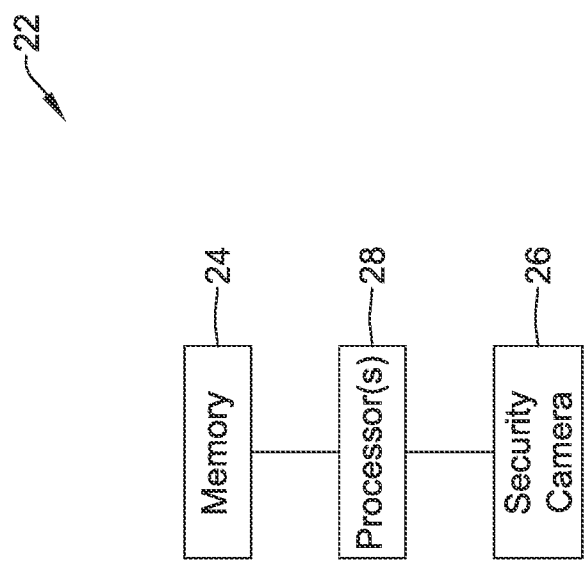
FIG. 2 is a schematic block diagram of an illustrative system for monitoring worker behavior in a secure area such as the illustrative data center of FIG. 1.

FIG. 2 is a schematic block diagram of an illustrative system 22 that may be used for monitoring the behavior of the authorized workers 20 within the secure area 12. The system 22 includes a memory 24, a security camera 26 that is located within or otherwise positioned to have a field of view within the secure area 12 and one or more processors 28 that are operably coupled to the memory 24 and to the security camera 26. It will be appreciated that at least the security camera 26 has to be in or near the secure area 12, while the memory 24 and the one or more processors 28 may be within the secure area 12 or may be remote to the secure area. Indeed, the memory 24 and the one or more processors 28 may be manifested within a remote desktop computer or even a remote cloud-based server, for example.

In one example, the one or more processors 28 are configured to maintain an Artificial Intelligence (AI) model (or other suitable model) for each authorized worker 20 in the memory 24. The AI model is specific to each authorized worker 20 and is representative of at least part of a behavior of the corresponding authorized worker 20 in the secure area 12. The one or more processors 28 are configured to receive a video stream from the security camera 26 and to process the video stream in order to identify each authorized worker 20 that enters the secure area 12 and to track a current behavior of each authorized worker 20 within the secure area 12. The one or more processors 28 are configured to compare the current behavior of each authorized worker 20 in the secure area 12 with the behavior represented by the AI model that corresponds to the authorized worker 20 and to transmit an alarm when the current behavior of one or more authorized workers 20 diverges from the behavior represented by the AI model that corresponds to the authorized worker 20. In some cases, the one or more processors 28 are further configured to suspend one or more access privileges to an authorized worker 20 when the current behavior of the authorized worker 20 diverges from the behavior represented by the AI model that corresponds to the authorized worker 20, wherein the one or more access privileges may include access privileges to the data center 10 and/or access privileges to data and/or control of one or more servers in the plurality of server racks 18 in the data center 10.

In some cases, the one or more processors 28 are also configured to initially develop the AI model (or other suitable model) for each of the authorized workers 20. Developing the AI model for each authorized worker 20 may include one or more of identifying a work schedule of the corresponding authorized worker 20, identifying a temporal pattern of the corresponding authorized worker 20 in the secure area, identifying a spatial pattern of the corresponding authorized worker 20 in the secure area, identifying tasks assigned to and carried out by the corresponding authorized worker 20 in the secure area, identifying skills possessed by the corresponding authorized worker 20, and identifying a worker category from a plurality of worker categories for the corresponding authorized worker 20. These are just examples.

Developing the AI model for each authorized worker 20 may include the one or more processors 28 performing one or more of identifying tasks assigned to the corresponding authorized worker 20 to be performed in the data center 10, learning a temporal pattern of the corresponding authorized worker 20 when working with the server racks 18, wherein the temporal pattern is dependent on the identified tasks assigned to the corresponding authorized worker 20, and learning a spatial pattern of the corresponding authorized worker 20 for each of the identified tasks when working with the server racks 18, wherein the spatial pattern is dependent on the identified tasks assigned to the corresponding authorized worker 20.

In some cases, developing the AI model for each authorized worker 20 may include performing video analysis of one or more video feeds showing the corresponding worker moving about the secure area. Developing the AI model for each authorized worker 20 may also include performing facial recognition on the one or more video feeds in order to identify the corresponding authorized worker 20 in the secure area, and tracking one or more activities of the corresponding authorized worker 20 in the secure area.

The one or more processors 28 may be configured to, as part of developing the AI model for each of the authorized workers 20, perform one or more of learning a temporal pattern of the corresponding worker when working with the server racks, and learning a spatial pattern of the corresponding worker when working with the server racks.

In some instances, the one or more processors 28 may be configured to, as part of developing the AI model for each of the authorized workers 20, perform one or more of identifying one or more server racks 18 that the corresponding authorized worker 20 is not authorized to interact with, and/or identifying times that the corresponding authorized worker 20 is not authorized to interact with particular ones of the one or more server racks 18.

The one or more processors 28 may be configured to, as part of developing the AI model for each of the authorized workers 20, perform one or more of identifying a worker category from a plurality of worker categories for the corresponding authorized worker 20, and identifying one or more server racks that the corresponding authorized worker 20 is not authorized to interact with based on the identified worker category.

In some instances, the one or more processors 28 may be configured to, as part of developing the AI model for each of the authorized workers 20, perform one or more of monitoring of a sequence of movements of the corresponding authorized worker 20 between the server racks 18, monitoring how much time the authorized worker 20 spends at each of the server racks 18, and monitoring a total time that the authorized worker 20 spends in the data center 10.

The AI model may represent a "normal" or expected behavior of the corresponding authorized worker. In some instances, the one or more processors 28 are configured to, when the current behavior for a particular authorized worker 20 diverges from the behavior represented by the AI model that corresponds to the particular authorized worker 20, ascertaining whether the divergence is due to an authorized change in the behavior of the particular authorized worker 20, and if so, updating the AI model for the particular authorized worker 20. In some cases, ascertaining whether the divergence is due to an authorized change in the behavior of the particular authorized worker 20 includes presenting information associated with the current behavior of the particular authorized worker 20 to a security operator, and wherein the security operator determines and manually indicates whether the divergence is due to an authorized change in the behavior of the particular authorized worker 20 or not.

In some cases, the AI model that corresponds to a particular authorized worker 20 is configured to identify one or more server racks 18 that the particular authorized worker 20 is not authorized to interact with, and/or times that the particular authorized worker 20 is not authorized to interact with particular ones of the one or more server racks 18.

Figure 3:
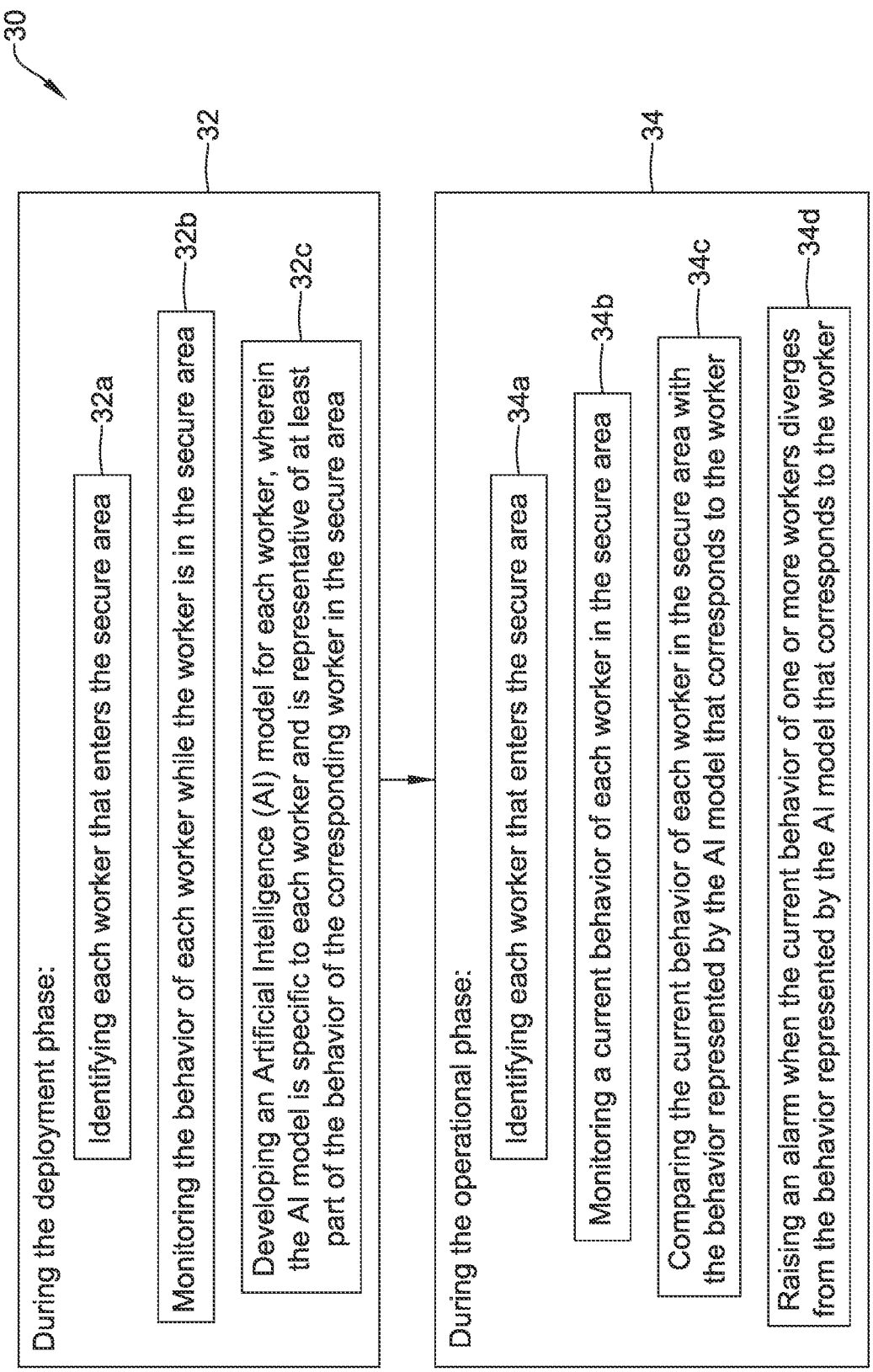
FIG. 3 is a flow diagram showing an illustrative method that may be carried out via the illustrative system of FIG. 2.

FIG. 3 is a flow diagram showing an illustrative method 30 of monitoring worker (such as the authorized workers 20) behavior within a secure area (such as the secure area 12). In some cases, the secure area is a data center (such as the data center 10) housing a plurality of server racks (such as the server racks 18). The illustrative method 30 includes a deployment phase, as indicated at block 32, and an operational phase, as indicated at block 34. During the deployment phase, each worker that enters the secure area is identified, as indicated at block 32a. In some cases, the secure area includes an access control system (such as the access control 16), and each worker that enters the secure area is identified via the access control system.

The behavior of each worker is monitored (e.g. via video) while the worker is in the secure area, as indicated at block 32b. Based on the monitored behavior, an Artificial Intelligence (AI) model is developed for each worker, wherein the AI model is specific to each worker and is representative of at least part of the monitored behavior of the corresponding worker in the secure area, as indicated at block 32c. In some cases, developing the AI model for each worker includes one or more of identifying a work schedule of the corresponding worker, identifying a temporal pattern of the corresponding worker in the secure area, identifying a spatial pattern of the corresponding worker in the secure area, identifying tasks assigned to and carried out by the corresponding worker in the secure area, identifying skills possessed by the corresponding worker, and identifying a worker category from a plurality of worker categories for the corresponding worker.

In some instances, developing the AI model for each worker may include one or more of learning a temporal pattern of the corresponding worker when working with the server racks, and/or learning a spatial pattern of the corresponding worker when working with the server racks.

In some cases, developing the AI model for each worker may include one or more of identifying tasks assigned to the corresponding worker to be performed in the data center, learning a temporal pattern of the corresponding worker when working with the server racks, wherein the temporal pattern is dependent on when the corresponding worker does what while performing the identified tasks assigned to the corresponding worker, and learning a spatial pattern of the corresponding worker when working with the server racks, wherein the spatial pattern is dependent at least in part on how the corresponding worker moves around within the data center while performing the identified tasks assigned to the corresponding worker.

In some instances, a temporal pattern of a corresponding worker may be developed over time, and may include learning how the corresponding worker performs their assigned tasks during varying periods of time over the year in order to establish what temporal patterns are expected for the corresponding worker. The temporal pattern of the corresponding worker may include any of a variety of different parameters, such as but not limited to access control information, work schedule, sequence of racks attended to, time spent at each of the racks, and total time spent in the server room or other secured area. In some instances, spatial patterns may be tracked on a pixelated map, for example.

Developing the AI model for each worker may, for example, include one or more of identifying one or more server racks that the corresponding worker is not authorized to interact with, and/or identifying times that the corresponding worker is not authorized to interact with particular ones of the one or more server racks. Developing the AI model for each worker may include one or more of identifying a worker category from a plurality of worker categories for the corresponding worker, and identifying one or more server racks that the corresponding worker is not authorized to interact with based on the identified worker category.

Developing the AI model for each worker may include performing video analysis of one or more video feeds showing the corresponding worker moving about the secure area. Developing the AI model for each worker may further include performing facial recognition on the one or more video feeds in order to identify the corresponding worker in the secure area, and tracking one or more activities of the corresponding worker in the secure area.

During the operational phase, each worker that enters the secure area is identified, as indicated at block 34a. The current behavior of each worker in the secure area is monitored, as indicated at block 34b. The current behavior of each worker in the secure area is compared with the behavior represented by the AI model that corresponds to the worker, as indicated at block 34c. An alarm is raised when the current behavior of one or more workers diverges from the behavior represented by the AI model that corresponds to the particular worker(s).

In some cases, the method 30 may include suspending one or more access privileges to a worker when the current behavior for the worker diverges from the behavior represented by the AI model that corresponds to the worker, wherein the one or more access privileges include access privileges to the data center and/or access privileges to data and/or control of one or more servers in the plurality of server racks.

In some instances, the secure area includes a data center housing a plurality of server racks, and monitoring the current behavior of each worker can include one or more of monitoring a sequence of movements of the corresponding worker between the server racks, monitoring how much time the worker spends at each of the server racks, and monitoring a total time that the worker spends in the data center, sometimes depending on particular tasks or tickets that are assigned to the corresponding worker.

When the current behavior for a particular worker diverges from the behavior represented by the AI model that corresponds to the particular worker, the method 30 may include ascertaining whether the divergence is due to an authorized change in the behavior of the particular worker, and if so, updating the AI model for the particular worker and then using the updated AI model going forward. In some cases, ascertaining whether the divergence is due to an authorized change in the behavior of the particular worker includes presenting information associated with the current behavior of the particular worker to a security operator, and wherein the security operator determines and manually indicates whether the divergence is due to an authorized change in the behavior of the particular worker or not.

Figure 4:
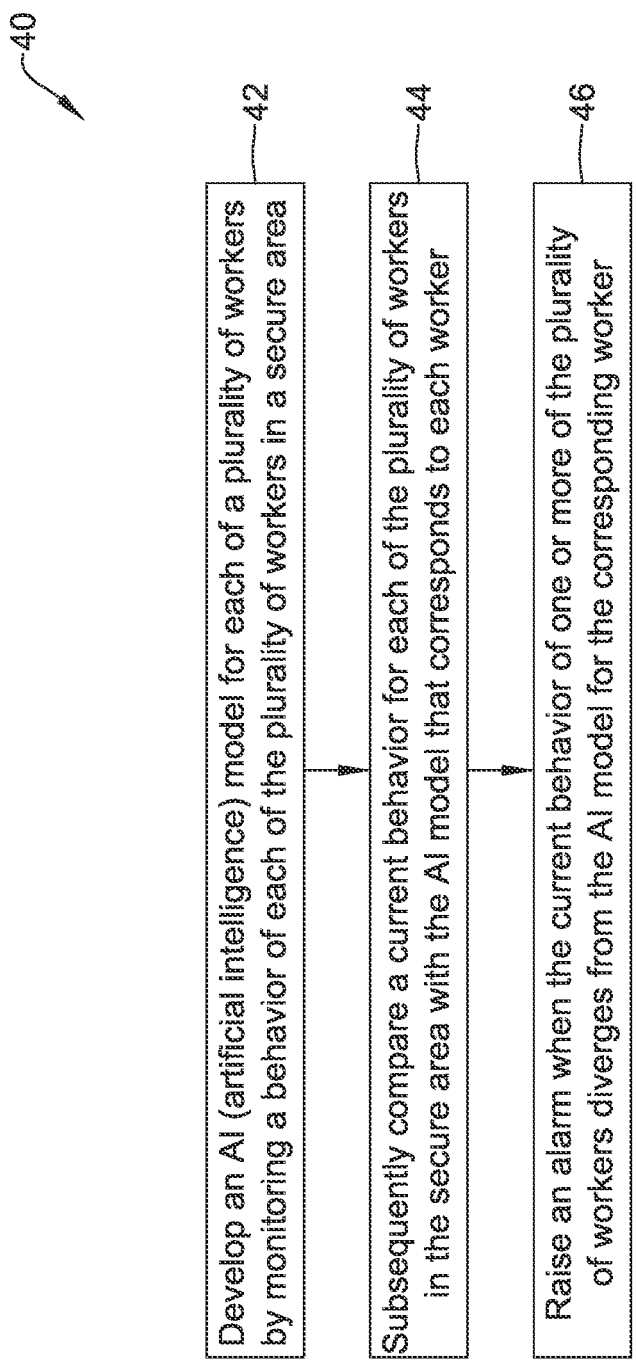
FIG. 4 is a flow diagram showing an illustrative method that may be carried out via the illustrative system of FIG. 2.

FIG. 4 is a flow diagram showing an illustrative method 40 that may be carried out by one or more processors (such as the one or more processors 28) when the one or more processors execute instructions that are stored on a non-transitory, computer-readable storage medium. The one or more processors are caused to develop an AI (Artificial Intelligence) model (or other suitable model) for each of a plurality of workers by monitoring a behavior of each of the plurality of workers in a secure area, as indicated at block 42. The one or more processors are caused to subsequently compare a current behavior for each of the plurality of workers in the secure area with the AI model that corresponds to each worker, as indicated at block 44. The one or more processors are caused to raise an alarm when the current behavior of one or more of the plurality of workers diverges from the AI model for the corresponding worker, as indicated at block 46.

In some cases, the secure area includes a data center housing a plurality of server racks. The behavior of each of the plurality of workers may include one or more of a temporal pattern of the corresponding worker when working with the server racks and a spatial pattern of the corresponding worker when working with the server racks. These are just examples.

Figure 5:
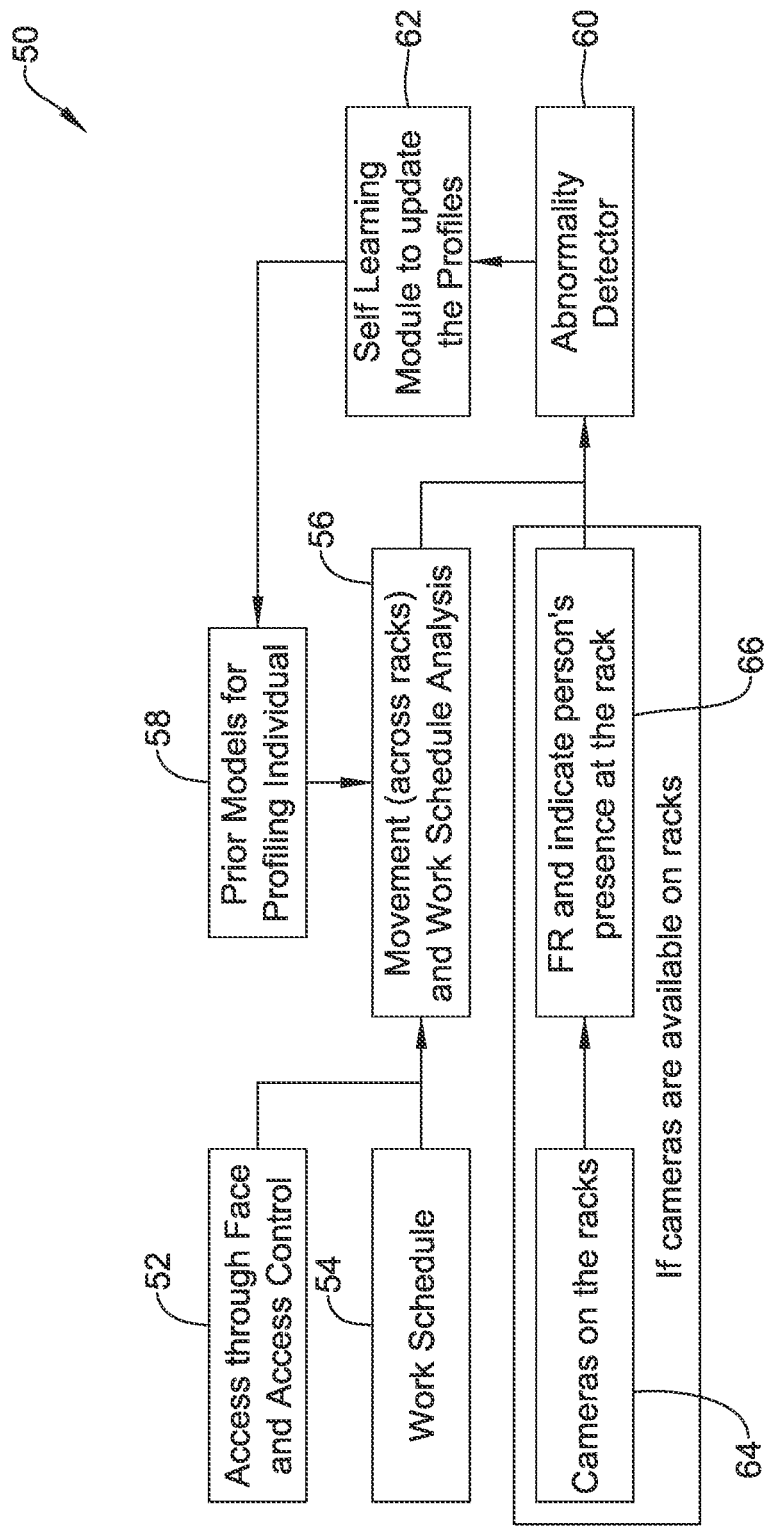
FIG. 5 is a schematic block diagram showing a system for monitoring worker behavior in a secure area such as the illustrative data center of FIG. 1.

FIG. 5 a schematic block diagram showing an illustrative system 50 for monitoring worker behavior in a secure area such as the illustrative data center of FIG. 1. The illustrative system 50 includes an access block 52 which includes access control (such as the access control 16) as well as facial recognition via video processing. A work schedule block 54 provides information regarding the work schedule for each of the workers. The access block 52 and the work schedule block 54 both provide information to an analysis block 56, which determines when and how workers are moving within the secure area. This can include an analysis of their work schedules in conjunction with their observed behavior in the secure area. A modeling block 58 provides information regarding previous models for profiling each of the workers to the analysis block 56. An abnormality block 60 provides information to a self-learning block 62, which itself provides information to the modeling block 58. The self-learning block 62 may identify if the abnormality of a particular worker is an approved abnormality, and if so, the self-learning block 62 may update the AI model for that particular worker and provide the updated AI model to the modeling block 58.

In some cases, there are cameras capturing video in and around the server racks, as indicated at camera block 64. When there are cameras capturing video in and around the server racks, a person detection block 66 utilizes facial recognition to determine which workers are at which server racks. The person detection block 66 provides information to the abnormality block 60 to help detect abnormalities in the behavior of workers.

Figure 6:
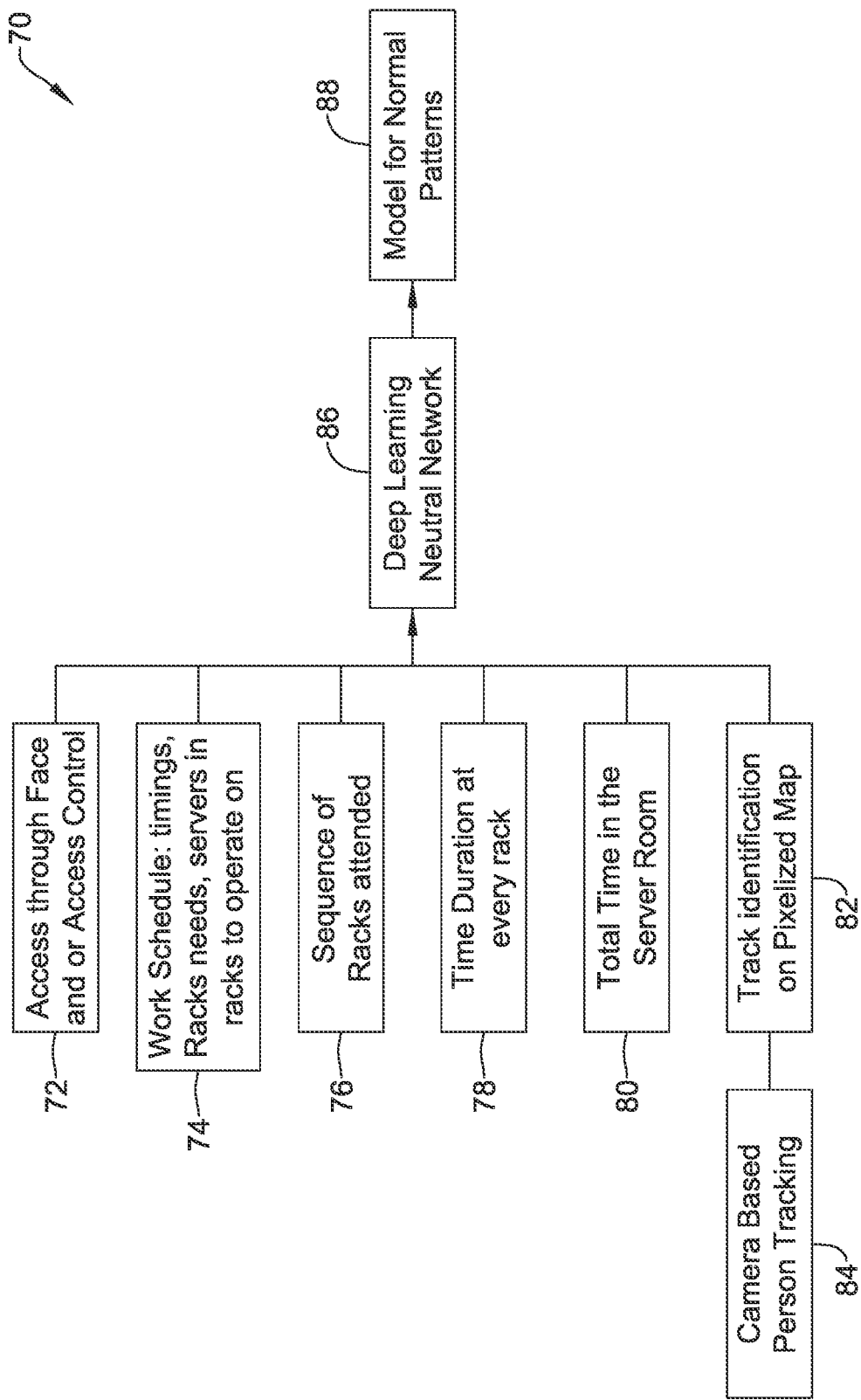
FIG. 6 is a schematic block diagram showing a system for monitoring worker behavior in a secure area such as the illustrative data center of FIG. 1.

FIG. 6 is a schematic block diagram showing part of an illustrative system 70 for monitoring worker behavior in a secure area such as the illustrative data center of FIG. 1, and may generally describe an illustrative function of the modeling block 58 of FIG. 5. The illustrative system 70 includes a number of inputs that are used in determining an Artificial Intelligence (AI) model for each of the workers. In the example shown, these inputs include access information block 72, work schedule information block 74, sequence of racks attended block 76, time duration at each rack block 78, total time in the server room block 80 and tracking on pixelized map block 82. In some cases, camera-based tracking 84 provides information to the tracking on pixelized map block 82. These and other inputs may be provided to a deep learning block 86, which in turn passes information to model block 88, which provides an AI model for each worker, based on normal or expected behavior sometimes observed during a deployment phase.

Figure 7:
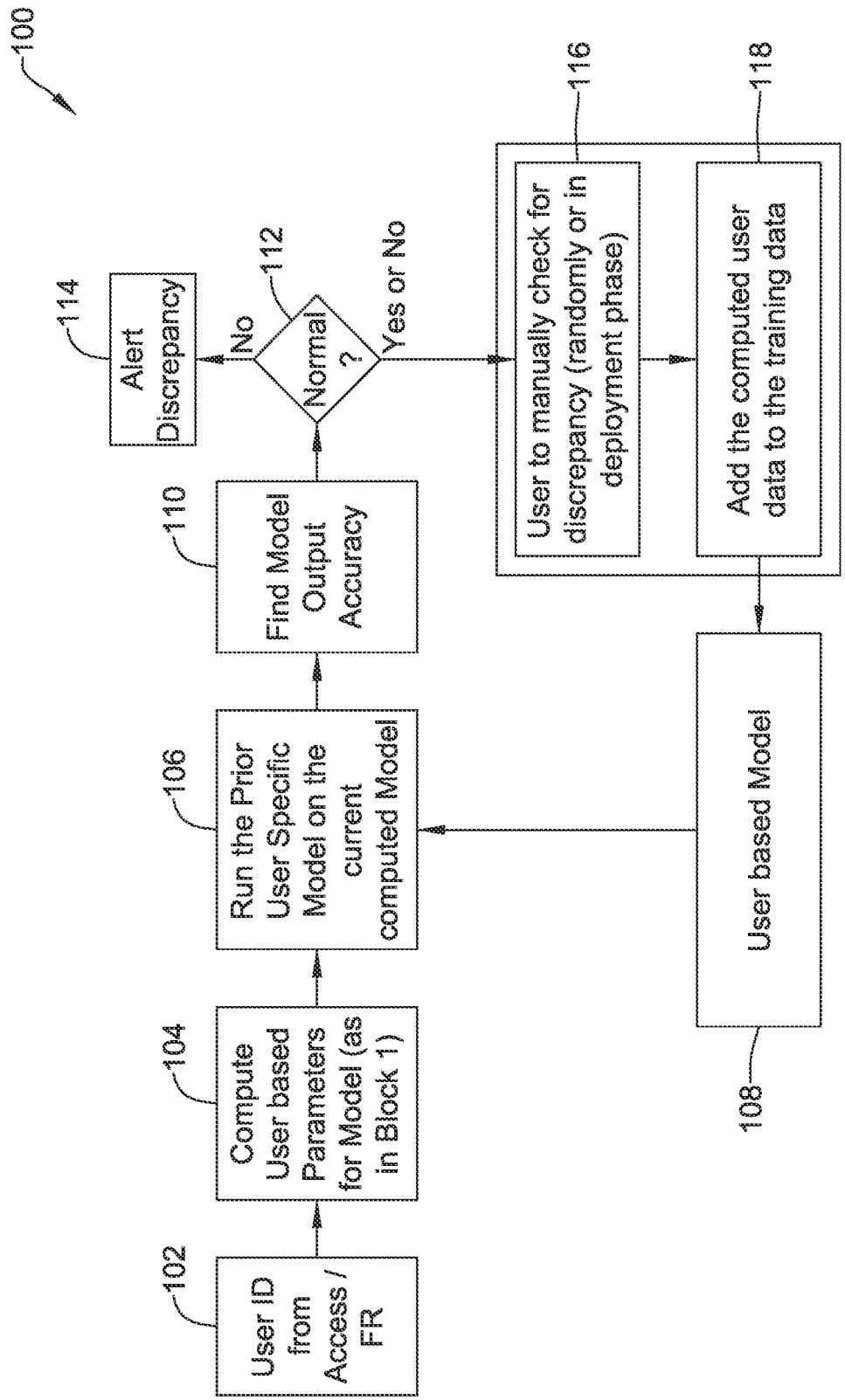
FIG. 7 is a schematic block diagram showing a system for monitoring worker behavior in a secure area such as the illustrative data center of FIG. 1.

FIG. 7 is a schematic block diagram showing an illustrative system 100 for monitoring worker behavior in a secure area such as the illustrative data center of FIG. 1, and may generally describe an illustrative function of the analysis block 56 and the self-learning block 62 of FIG. 5. At block 102, a user ID is received. At block 104, user-based parameters are calculated in accordance with the user ID and the AI model for that particular user. At block 106, the prior user-specific model is compared to the current AI model for the particular user. The current AI model may be representative of the current behavior of the particular user in the secure area, and the prior user-specific model may be representative of the normal or expected behavior of the particular user. At block 110, the accuracy of the model is ascertained, which may be representative of a magnitude of divergence between the current behavior of the particular user and the normal or expected behavior of the particular user. At decision block 112, a determination is made as to whether the user's behavior is normal and expected. In one example, when the magnitude of the divergence between the current behavior of the particular user and the normal or expected behavior of the particular user is greater than a threshold, a determination is made that the user's behavior is not normal or expected. If user's behavior is not normal or expected, control passes to an alert block 114 where an alarm is raised.

In some cases, regardless of whether the user's behavior is normal and expected, control passes to block 116, where a user manually checks for discrepancies. This may occur randomly, for example, or during a deployment phase. The information is passed to block 118, where the computed user data is added to the training data for training the AI model. In some cases, blocks 116 and 118 together correspond to the self-learning block 62.

Figure 8:
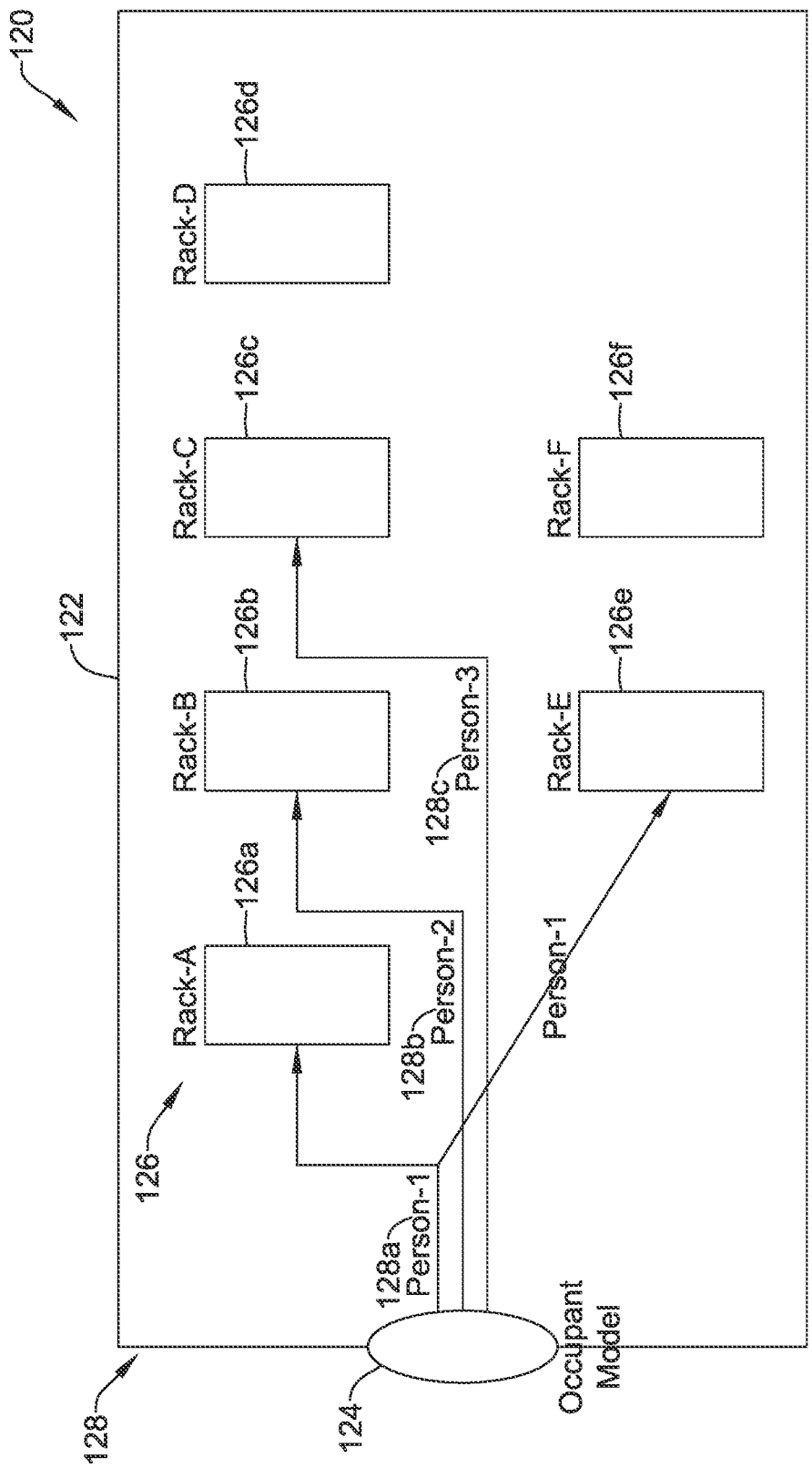
FIG. 8 is a schematic example of the methods of FIGS. 3 and 4.

FIG. 8 is a schematic example of detecting a possible abnormality. FIG. 8 schematically shows a data center 120 that includes a secure area 122. The data center 120 and the secure area 122 may be considered as examples of the data center 10 and the secure area 12 shown in FIG. 1. An occupant model block 124 includes an AI model for each of the workers. The secure area 122 includes a number of server racks 126, individually labeled as 126a, 126b, 126c, 126d, 126e and 126f. As shown, there are three people 128, individually labeled as 128a, 128b and 128c. In accordance with the AI models stored within the occupant model block 124, the person 128a is expected to travel to the server rack 126a (Rack-A), the person 128b is expected to travel to the server rack 126b (Rack-B) and the person 128c is expected to travel to the server rack 126c (Rack-C).

If the people 128 behave as expected in their respective AI models, no alarms are raised. However, say that on a particular day, the person 128a travels to the server rack 126e (Rack-E) (instead of the server rack 126a as expected per the AI model for that person). This would cause an anomaly to be recognized, because the person 128a is not doing what they are expected to do per the AI model for that person. The expectation for a particular person 128 to visit a particular server rack may be predicted by the AI model for that particular person 128 and may depend on whether or not the particular person 128 has a current work order or other reason to visit a particular server rack 126, or has the skills to work on a particular server rack 126. These are just examples.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of monitoring worker behavior within a secure area of a data center that includes a plurality of server racks, the method including a deployment phase and an operational phase, the method comprising:
   during the deployment phase:
      identifying an identity of each worker that enters the secure area of the data center;
      monitoring the behavior of each worker while the worker is in the secure area;
      developing an Artificial Intelligence (AI) model for each worker, wherein the AI model is specific to each worker and is representative of at least part of the behavior of the corresponding worker in the secure area, wherein developing the AI model for each worker includes receiving one or more of:
         tasks assigned to and carried out by the corresponding worker in the secure area;
         skills possessed by the corresponding worker; and a worker category from a plurality of worker categories for the corresponding worker;

during the operational phase:
identifying the identity of each worker that enters the secure area of the data center;
monitoring a current behavior of each worker in the secure area;
comparing the current behavior of each worker in the secure area with the behavior represented by the AI model that corresponds to the worker; and
raising an alarm when the current behavior of one or more workers diverges from the behavior represented by the AI model that corresponds to the worker.

2. The method of claim 1, wherein the secure area includes an access control system, and the identity of each worker that enters the secure area is identified via the access control system.

3. The method of claim 1, wherein developing the AI model for each worker comprises learning one or more of:
a work schedule of the corresponding worker;
a temporal pattern of the corresponding worker in the secure area; and
a spatial pattern of the corresponding worker in the secure area.

4. The method of claim 1, wherein developing the AI model for each worker comprises performing video analysis of one or more video feeds showing the corresponding worker moving about the secure area.

5. The method of claim 4, wherein developing the AI model for each worker comprises performing facial recognition on the one or more video feeds in order to identify the identity of the corresponding worker in the secure area, and tracking one or more activities of the corresponding worker in the secure area.

6. The method of claim 1, wherein developing the AI model for each worker comprises learning one or more of:
a temporal pattern of the corresponding worker when working with the server racks; and
a spatial pattern of the corresponding worker when working with the server racks.

7. The method of claim 1, wherein developing the AI model for each worker comprises one or more of:
identifying tasks assigned to the corresponding worker to be performed in the data center;
learning a temporal pattern of the corresponding worker when working with the server racks, wherein the temporal pattern is dependent on when the corresponding worker does what while performing the identified tasks assigned to the corresponding worker; and
learning a spatial pattern of the corresponding worker when working with the server racks, wherein the spatial pattern is dependent at least in part on how the corresponding worker moves around within the data center while performing the identified tasks assigned to the corresponding worker.

8. The method of claim 1, wherein developing the AI model for each worker comprises one or more of:
identifying one or more server racks that the corresponding worker is not authorized to interact with; and
identifying times that the corresponding worker is not authorized to interact with particular ones of the one or more server racks.

9. The method of claim 8, wherein developing the AI model for each worker comprises one or more of:
identifying a worker category from a plurality of worker categories for the corresponding worker; and
identifying one or more server racks that the corresponding worker is not authorized to interact with based on the identified worker category.

10. The method of claim 1, further comprising:
suspending one or more access privileges to a worker when the current behavior for the worker diverges from the behavior represented by the AI model that corresponds to the worker, wherein the one or more access privileges include access privileges to the data center and/or access privileges to data and/or control of one or more servers in the plurality of server racks.

11. The method of claim 1, wherein monitoring the current behavior of each worker comprises one or more of:
monitoring a sequence of movements of the corresponding worker between the server racks of the data center;
monitoring how much time the worker spends at each of the server racks; and
monitoring a total time that the worker spends in the data center.

12. The method of claim 1, wherein:
when the current behavior for a particular worker diverges from the behavior represented by the AI model that corresponds to the particular worker, ascertaining whether the divergence is due to an authorized change in the behavior of the particular worker, and if so, updating the AI model for the particular worker.

13. The method of claim 12, wherein ascertaining whether the divergence is due to an authorized change in the behavior of the particular worker comprises presenting information associated with the current behavior of the particular worker to a security operator, and wherein the security operator determines and manually indicates whether the divergence is due to an authorized change in the behavior of the particular worker or not.

* * * * *